United States Patent [19]
Lemmens

[11] Patent Number: 5,921,140
[45] Date of Patent: Jul. 13, 1999

[54] INDEX SHIFTER FOR A BICYCLE TRANSMISSION AND A METHOD OF MAKING AN INDEX SHIFTER FOR A BICYCLE TRANSMISSION

[75] Inventor: Nico Lemmens, Bergrheinfeld, Germany

[73] Assignee: Fichtel & Sachs AG, Schweinfurt, Germany

[21] Appl. No.: 08/825,813

[22] Filed: Apr. 3, 1997

Related U.S. Application Data

[60] Provisional application No. 60/023,526, Aug. 7, 1996.

[30] Foreign Application Priority Data

Apr. 4, 1996 [DE] Germany .......................... 196 13 575

[51] Int. Cl.[6] .......................... B60K 20/00; G05G 11/00; F16H 7/22
[52] U.S. Cl. ..................................... 74/473.28; 74/473.13; 74/489; 74/527; 474/128
[58] Field of Search .............................. 74/473.1, 473.28, 74/473.13, 473.14, 473.15, 489, 502.2, 527, 469, 500.5, 501, 576, 575; 474/111, 78, 112, 135, 128, 129; 267/30, 152, 158; 192/64

[56] References Cited

U.S. PATENT DOCUMENTS

| | | | |
|---|---|---|---|
| 4,012,183 | 3/1977 | Calabretta | 267/152 |
| 4,921,472 | 5/1990 | Young | 471/111 |
| 5,266,066 | 11/1993 | White | 474/111 |
| 5,503,598 | 4/1996 | Neuer et al. | 474/78 |
| 5,522,611 | 6/1996 | Schimidt et al. | 192/64 |
| 5,524,501 | 6/1996 | Patterson et al. | 74/489 X |
| 5,588,925 | 12/1996 | Arbeiter et al. | 474/128 X |
| 5,618,241 | 4/1997 | Ose | 74/489 X |

FOREIGN PATENT DOCUMENTS 0676325  10/1995  European Pat. Off. .

Primary Examiner—John A. Jeffery
Assistant Examiner—Marcus Charles
Attorney, Agent, or Firm—Nils H. Ljungman & Associates

[57] ABSTRACT

An index shifter (1) for a bicycle transmission is placed on a handle bar (3). The index shifter has a housing (2) and a notch element (4) with notches (5), which notch element is connected with a rotatable handgrip and with one of the ends of a control cable (7). The housing has an oblong annular space in which a combination notch spring (20) is placed. This spring supports itself on the housing with two feet (24) and acts in concert with the notch element (4) through a projection (23). The combination notch spring (20), composed of a form spring (21) and a leaf spring (22), permits quiet shifting and supplies sufficiently high pre-tension spring power throughout the service life of the combination notch spring (20).

20 Claims, 2 Drawing Sheets

INDEX SHIFTER FOR A BICYCLE TRANSMISSION AND A METHOD OF MAKING AN INDEX SHIFTER FOR A BICYCLE TRANSMISSION

This application claims the benefit of U.S. Provisional Application No. 60/023,526 filed Aug. 7, 1996.

BACKGROUND OF THE INVENTION

1. Field of the Invention

The invention concerns an index shifter for a bicycle transmission. The index shifter has a housing which encloses a handle bar. A notch element with notches is mounted on a pivot within the housing and has a control cable to operate the bicycle transmission. A notch spring or detent spring is placed between the casing and the notch element, The notch spring is located in a recess of the housing, which recess has end stops to limit the motion of the notch spring.

2. Background Information

European Patent No. 0 676 325 A2 describes a known index shifter which shows a notch spring that consists of spring band material and has an asymmetric shape so that it can act in concert with the notches of a notch element through a projection or nose. The projection or nose is placed at the end of a spring arm that leads off from a side end, which side end is connected with the opposite end through an extended and arched bow. This enhanced spring design has advantages over a known plastic spring disclosed in FIG. 1 of European Patent No. 0 676 325 A2. However, the improved spring has the disadvantage of making more noise than the known plastic spring during shifting. The unfavorable properties of plastic, such as deforming under external forces through its creep properties in the course of time, however, are characteristic of the plastic spring.

OBJECT OF THE INVENTION

To combine the advantages of a durable steel spring with the advantages of a plastic spring, which plastic spring makes less noise, it in now suggested to develop a combination notch spring, composed of a form spring made of plastic and a leaf spring which is inserted in the form spring.

Therefore, the object of the invention is to create a notch spring which allows quiet shifting of the transmission, but also maintains initial tension placed on the notch spring.

SUMMARY OP THE INVENTION

The solution to this problem is accomplished by a notch spring which is located in a recess of an index shifter housing. The notch spring is made up of a form spring and a leaf spring. The form spring has a projection for engaging notches in the casing and two supports for supporting the leaf spring.

The form spring can have feet for resting in the recess of the housing. The supports can extend from the feet of the form spring, each support pointing inwards, on which supports the respective ends of the leaf spring rest and act with it in concert.

The leaf spring acts together with the form spring in a pre-tensioned position. The leaf spring and form spring cooperate at essentially three points: the leaf spring's ends act on both of the supports, which supports are on the feet, and a bend of the leaf spring contacts the middle part of the form spring below a projection.

The form spring can have an arrangement to aid in the lining up of the leaf spring with the form spring, such as inclines on the supports for guiding the leaf spring into the form spring.

The leaf spring can be tightly connected with the form spring.

The leaf spring can be locked in the form spring by end stops and position projections.

BRIEF DESCRIPTION OF THE DRAWINGS

The suggested invention is presented with the help of drawings of examples of working designs.

DESCRIPTION OF THE PREFERRED EMBODIMENTS

Figure 1:
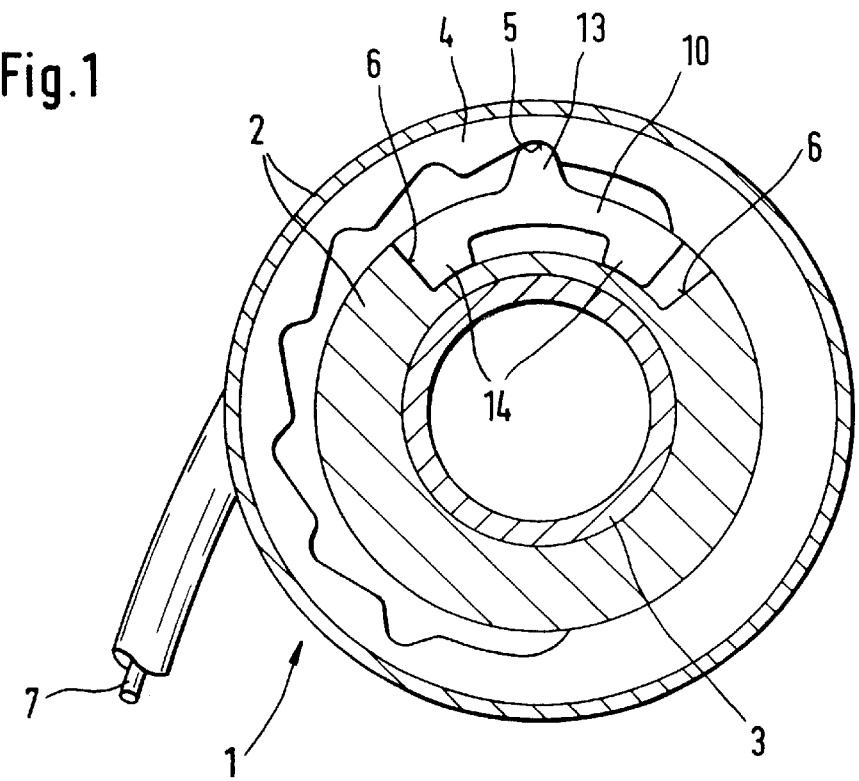
FIG. 1 shows an index shifter with a casing, a notch element as well as a notch spring in a sectional view.

FIG. 1 shows an index shifter 1 for operating a bicycle transmission. The index shifter 1 includes a casing or housing 2 which, in the case presented here, is placed around a steering bar or handlebar 3 and shows a detent spring or notch spring 10, which notch spring 10 is placed in an oblong annular space with end stops 6. A notch element 4 is connected with a handgrip, not shown here, which is mounted on a pivot concentric to the handlebar 3 and shows notches 5 which notches 5 act in concert with a projection, lug, or nose 13 of the notch spring 10. The notch spring 10 shows supports or feet 14 that are placed on both ends of the notch spring 10 and which feet 14 support themselves in the oblong annular space of the housing 2. The notch spring 10, in the circumferential direction, does not entirely fill the oblong annular space in the housing 2—that is why a gap occurs, while shifting back and forth, which gap makes a backlash possible that corresponds to the play that occurs in an operating pull or control cable 7 and then the notch spring 10 stops the back lash when the notch spring 10 touches the corresponding end stop 6.

In other words, the notch element 4 is rotatable about the handlebar 3, while the housing 2 is non-rotationally connected to the handlebar 3, typically by a clamping device (not shown). As the notch element 4 rotates about the handlebar 3, the control cable 7 is pulled in or out depending on the direction of rotation of the notch element 4. The pulling in and out of the control cable 7 operates the bicycle transmission (not shown). The projection 13 of the detent spring 10 engages a notch 5 of the notch element 4. Because the position of the notch spring 10 is restricted to the oblong annular space of the housing 2, the position of the notch element 4 is limited by the notch spring 10 when the projection 13 of the detent spring 10 is engaged in a single notch 5. The projection 13 of the notch spring 10 can engage different notches 5 by manually rotating the notch element 4 around the handlebar 3. Typically, each notch 5 of the notch element 4 corresponds to a different gear in the bicycle transmission. Because there is a gap between the notch spring 10 and the housing 2, some movement of the control cable can occur without the projection 13 moving between notches 5. This movement is referred to as backlash hereinabove.

Figure 2:
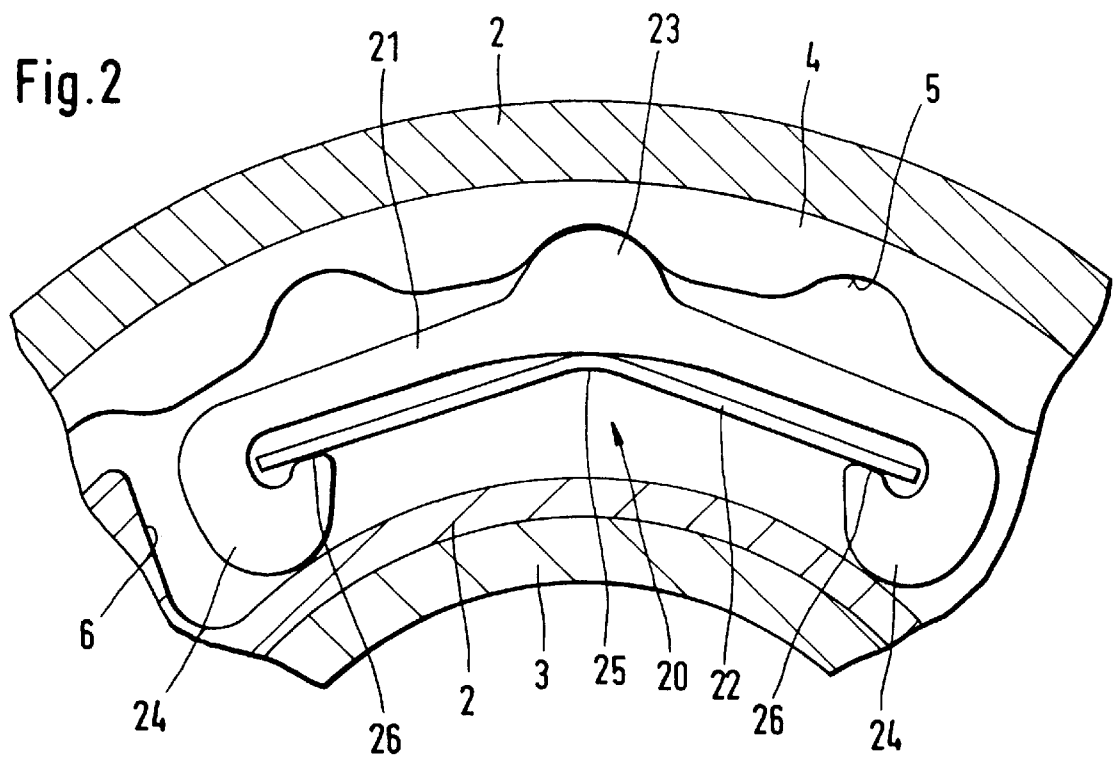
FIG. 2 shows the notch spring as a combination notch spring, composed of a form spring and a leaf spring in the fitted position.

The proposed invention of an improved notch spring is presented in FIG. 2 where a combination notch spring 20, composed of a spring or form spring 21 and a leaf spring 22, is disclosed. The leaf spring 22 is almost entirely embraced by the form spring 21; the form spring 21 shows a projection 23, and the form spring 21 shows a foot 24 at each outer end. Each foot 24 is shaped so that a support 26 is formed, which support 26 acts in concert with the respective end of the leaf spring 22. The leaf spring 22 shows a bend 25 in its center part; this bend 25, in the fitted position in which fitted position the leaf spring 22 can be pre-tensioned, is acting in concert with the center part of the form spring 21, which bend 25 is located below the projection 23. The position of the combination notch spring 20 corresponds to the placement of the notch spring 10, as shown in FIG. 1, thus the notch spring 20 is also in the oblong annular space of the housing 2 with end stops 6 and the afore-mentioned backlash.

The supporting feet 24 and the projection 23 are disposed on an outside surface of the spring 21. In addition, the supports 26 project from an inner surface of the spring 21 to support ends of the leaf spring 22.

The pre-tensioning occurs to some extent during the installation of the leaf spring 22 on the spring 21. However, most of the pre-tensioning of the leaf spring 22 occurs upon installing the combination notch spring 20 between the housing 2 and the notch element 4.

Figure 3:
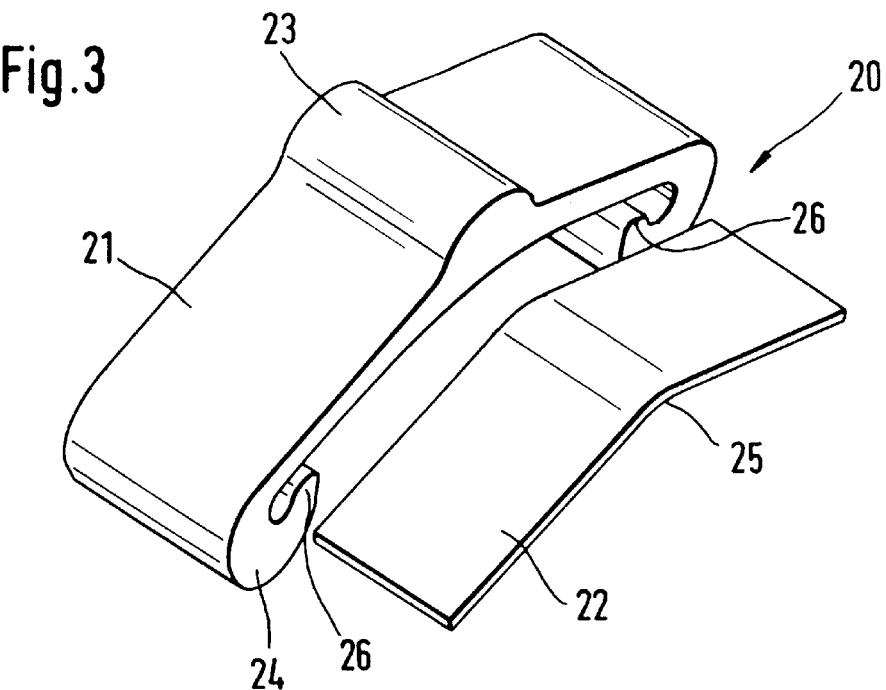
FIG. 3 shows the notch spring pursuant to FIG. 2 in an exploded view.

In FIG. 3 it is displayed how the leaf spring 22 can be positioned in the form spring 21. The supports 26 can be made out clearly on which the ends of the leaf spring 22, in the fitted position, support themselves. In the fitting process of the leaf spring 22, the bend 25 slides underneath the center part of the form spring with the projection 23.

Figure 4:
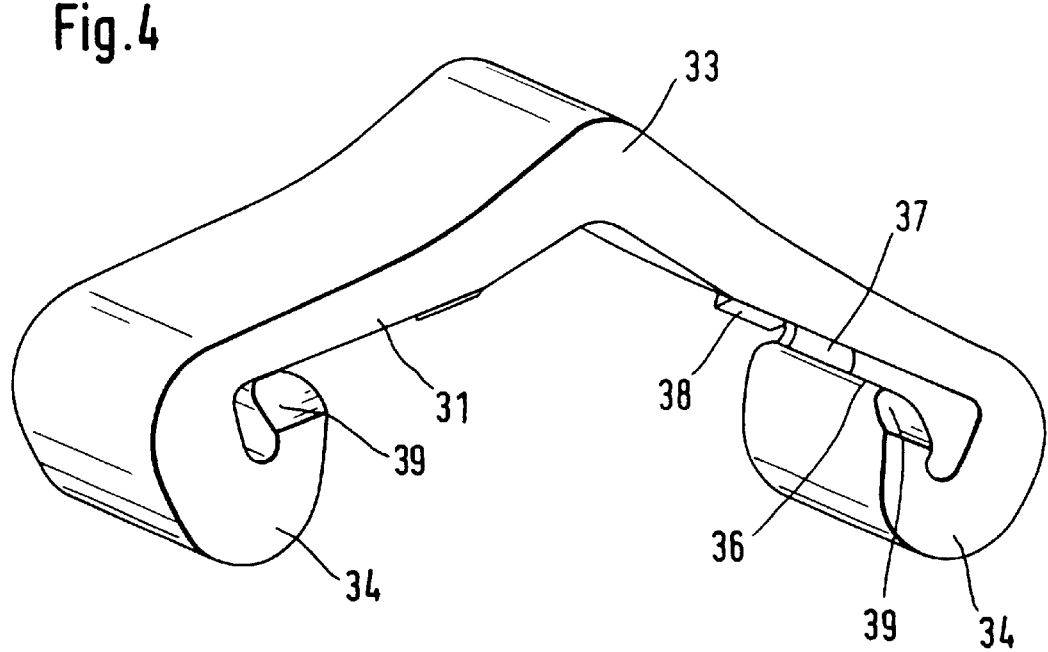
FIG. 4 shows a form spring with an end stop and a position projection for positioning the leaf spring.

FIG. 4 shows a variation of a spring or form spring 31 which also shows, same as the form spring 21, a projection 33 and two feet 34, each foot 34 with a support 36 (only one support 36 is clearly shown, but the other support 36 is located on the opposite leg 34), This form spring 31 is combinable with the leaf spring 22; there is some line-up aid in the form of inclines 39, however, as well as a locking mechanism for the leaf spring 22 in the form of two end stops 37 and two position projections 38. The two end stops 37 (only one end stop 37 is shown, but the other end stop 37 is located at the opposite end of the form spring 31) prevent the leaf spring 22 from moving out of the proper functioning position both during installation of the leaf spring 22 on the form spring 31 and during use of the improved notch spring 20. The two position projections 38 have an inclined surface to facilitate installation of the loaf spring 22 on the form spring 31, and after installation of the leaf spring 22, the two position projections 38 prevent the leaf spring 22 from moving out of position by engaging the edge of the leaf spring 22.

The spring 21, 31 is typically made out of plastic for favorable surface sliding characteristics, such as low noise. The leaf spring 22 is typically made out of metal such as spring steel for favorable pre-tensioning characteristics, such as strength and durability.

In manufacturing the combination notch spring 20 from the spring 21 and leaf spring 22, the inclines 39 direct the leaf spring 22 into the form spring 21 during installation of the leaf spring 22 on the spring 21. In addition, the end stops 37 prevent the leaf spring 22 from moving beyond the installation position of the leaf spring 22 on the spring 21, during the installation of the leaf spring 22 on the spring 21. Further, the position projections or retaining projections 38 serve to retain the leaf spring 22 on the spring 21 once the leaf spring 22 has been moved beyond the retaining projections 38 and into the installation position. The end stops 37 and retaining projections 38 also hold the leaf spring 22 in the proper installed position during operation of the index shifter.

In all of these cases, through combining the form spring 21 or 31 with the leaf spring 22, the advantages of a quiet plastic spring are combined with the favorable glide properties of a steel spring and the advantages of a steel spring's pre-tension power at any level of tension.

Examples of bicycle transmission shifters which could possibly be used in conjunction with the present invention can be found in the following U.S. Pat. No. 5,588,925; No. 5,524,501; No. 3,218,879; and No. 4,938,733.

Examples of bicycle transmissions which could possibly be used in conjunction with the present invention can be found in the following U.S. Pat. No. 5,503,598 and No. 5,522,611.

One feature of the invention resides broadly in the index shifter 1 for a bicycle transmission, comprising a housing 2 which encloses a handle bar 3, a notch element 4 with notches 5, which notch element 4 is mounted on a pivot within the housing 2 and has an operating cable 7 to operate the bicycle gear, a notch spring 10, placed between the casing 2 and the notch element 4; the notch spring 10 is located in a recess of the housing 2 with end stops 6, characterized by the fact that a notch spring 20 is located in the recess of the casing 2, the notch spring 20 comprising a form spring 21,31 and a loaf spring 22; the form spring 21,31 comprising a projection 23,33 and two supports 24,34.

Another feature of the invention resides broadly in the index shifter characterized by the fact that the feet 24,34 of the form spring 21,31 show supports 26,36, each pointing inwards, on which the respective ends of the leaf spring 22 rest and act with it in concert.

Yet another feature of the invention resides broadly in the index shifter characterized by the fact that the leaf spring 22 acts in concert with the form spring 21,31 in a pre-tensioned position, essentially at three points, i.e., the leaf spring's ends act in concert with both of the supports 26,36 on the feet 24,34, and a bend 25 acts in concert with the middle part of the form spring 21,31 below a nose 23,33.

Still another feature of the invention resides broadly in the index shifter characterized by the fact that the form spring 31 shows some line-up aid in the form of inclines 39 on the supports 36 for fitting the leaf spring 22.

A further feature of the invention resides broadly in the index shifter characterized by the fact that the leaf spring 22 is tightly connected with the form spring.

Another feature of the invention resides broadly in the index shifter characterized by the fact that the leaf spring 22 is locked in the form spring 31 through end stops 37 and position noses 38.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 13 575.3, filed on Apr. 4, 1996, having inventor Nico Lemmens, and DE-OS 196 13 575.3 and DE-PS 196 13 575.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. An index shifter for a bicycle transmission, said bicycle index shifter comprising:
    a bicycle index shifter housing to be disposed on a handle bar of a bicycle;
    a bicycle index shifter notch element disposed to pivot within said housing to operate a control cable of a bicycle transmission;
    said bicycle index shifter notch element comprising a plurality of notches;
    a bicycle index shifter notch spring disposed between said housing and said notch element;
    said bicycle index shifter notch spring being disposed in a recess of said housing;
    said bicycle index shifter notch spring comprising a first bicycle index shifter spring element and a second bicycle index shifter spring element;
    said second bicycle index shifter spring element comprising a leaf spring;
    said first bicycle index shifter spring element comprising a projection disposed to alternately engage ones of said plurality of notches;
    said first bicycle index shifter spring element comprising a support disposed to support said first bicycle index shifter spring element in said recess; and
    said leaf spring being configured and disposed to minimize the deformation of said first bicycle index shifter spring element upon repeated use of said bicycle index shifter.

2. The index shifter of claim 1 wherein:
    said first spring element comprises an inner surface disposed adjacent to said leaf spring;
    said first spring element comprises an outer surface disposed opposite said inner surface;
    said leaf spring comprises a first end and a second end;
    said support comprises an inner support disposed to support said ends of said leaf spring; and
    said inner support projects from said inner surface of said first spring element.

3. The index shifter of claim 2 wherein:
    said support comprises a first support and a second support disposed to support said first spring element in said recess;
    said inner support comprises a first inner support and a second inner support projecting from said inner surface;
    said first inner support is disposed to support said first end of said leaf spring;
    said second inner support is disposed to support said second end of said leaf spring;
    said leaf spring comprises a bent portion;
    said projection is disposed on a middle portion of said first spring element;
    said projection is disposed on said outer surface of said first spring element;
    said bent portion of said leaf spring is disposed to contact said inner surface of said first spring element substantially opposite to said projection;
    said bent portion of said leaf spring is configured to pre-tension said leaf spring;
    said notch spring is configured and disposed to provide an initial biasing force; and
    said leaf spring is configured and disposed to minimize the deformation of said first spring element upon repeated use of said bicycle index shifter and thus substantially maintain said initial biasing force.

4. The index shifter of claim 3 wherein:
    said first spring element comprises means for lining up said leaf spring with said first spring element upon installing said leaf spring on said first spring element; and
    said means for lining up comprises at least one inclined surface disposed on at least one of said first and second inner supports.

5. The index shifter of claim 4 wherein said notch spring comprises means for tightly connecting said leaf spring with said first spring element.

6. The index shifter of claim 5 wherein:
    said leaf spring is moved in an installation direction to install said leaf spring in an installation position on said first spring element;
    said tightly connecting means comprises an end stop disposed on said first spring element to contact said leaf spring to hold said leaf spring in the installation position by stopping movement of said leaf spring in the installation direction; and
    said tightly connecting means comprises a retaining projection disposed on said first spring element to contact said leaf spring to hold said leaf spring in the installation position by stopping movement of said leaf spring in a direction opposite to the installation direction.

7. The index shifter of claim 6 wherein:
    said first spring element comprises plastic; and
    said leaf spring comprises metal.

8. An index shifter for a bicycle transmission, said bicycle index shifter comprising:

a bicycle index shifter housing to be disposed on a bicycle;

a bicycle index shifter pivoting element to pivot on said housing to operate a bicycle transmission;

a bicycle index shifter notch element comprising a plurality of notches to permit the shifting of bicycle gears;

said bicycle index shifter housing comprising a recess;

a bicycle index shifter notch spring disposed in said recess;

said bicycle index shifter notch spring comprising a first bicycle index shifter spring element and a second bicycle index shifter spring element;

said second bicycle index shifter spring element comprising a leaf spring;

said first bicycle index shifter spring element comprising a projection disposed to alternately engage ones of said plurality of notches;

said first bicycle index shifter spring element comprising a support disposed to support said first bicycle index shifter spring element in said recess;

said bicycle index shifter notch spring being configured and disposed in said recess to provide an initial biasing force; and said leaf spring being configured and disposed to minimize the deformation of said first bicycle index shifter spring element and thus substantially maintain said initial biasing force upon repeated use of said bicycle index shifter.

9. The index shifter of claim 8 wherein:

said first spring element comprises an inner surface disposed adjacent to said leaf spring;

said first spring element comprises an outer surface disposed opposite said inner surface;

said leaf spring comprises a first end and a second end;

said support comprises an inner support disposed to support said ends of said leaf spring; and said inner support projects from said inner surface of said first spring element.

10. The index shifter of claim 9 wherein:

said support comprises a first support and a second support disposed to support said first spring element in said recess;

said inner support comprises a first inner support and a second inner support projecting from said inner surface;

said first inner support is disposed to support said first end of said leaf spring;

said second inner support is disposed to support said second end of said leaf spring;

said leaf spring comprises a bent portion;

said projection is disposed on a middle portion of said first spring element;

said projection is disposed on said outer surface of said first spring element;

said bent portion of said leaf spring is disposed to contact said inner surface of said first spring element substantially opposite to said projection; and said bent portion of said leaf spring is configured to pre-tension said leaf spring.

11. The index shifter of claim 10 wherein:

said first spring element comprises means for aligning said leaf spring with said first spring element upon installing said leaf spring on said first spring element; and said means for aligning comprises at least one inclined surface disposed on at least one of said first and second inner supports.

12. The index shifter of claim 11 wherein said notch spring comprises means for tightly connecting said leaf spring with said first spring element.

13. The index shifter of claim 12 wherein:

said leaf spring is moved in an installation direction to install said leaf spring in an installation position on said first spring element;

said tightly connecting means comprises an end stop disposed on said first spring element to contact said leaf spring to hold said leaf spring in the installation position by stopping movement of said leaf spring in the installation direction; and said tightly connecting means comprises a retaining projection disposed on said first spring element to contact said leaf spring to hold said leaf spring in the installation position by stopping movement of said leaf spring in a direction opposite to the installation direction.

14. The index shifter of claim 13 wherein:

said first spring element comprises plastic; and said leaf spring comprises metal.

15. The index shifter of claim 14 wherein:

said pivoting element comprises said notch element; and said housing comprises said recess.

16. A method of manufacturing an index shifter for a bicycle transmission, the bicycle index shifter comprising: a bicycle index shifter housing to be disposed on a handle bar of a bicycle; a bicycle index shifter notch element disposed to pivot within said housing to operate a bicycle control cable of a bicycle transmission; said notch element comprising a plurality of notches; a bicycle index shifter notch spring disposed between the housing and the notch element; said notch spring being disposed in a recess of said housing; said notch spring comprising a first bicycle index shifter spring element and a second spring element; said second bicycle index shifter spring element comprising a leaf spring; said first spring element comprising a projection disposed to alternately engage ones of said plurality of notches; and said first spring element comprising a support disposed to support said first spring element in said recess; said method of manufacturing an index shifter comprising the steps of:

providing a bicycle index shifter housing comprising a recess;

providing a bicycle index shifter notch element;

providing a first bicycle index shifter spring element comprising a support and a projection; and providing a bicycle index shifter leaf spring;

said method of manufacturing an index shifter comprising the further steps of:

installing said leaf spring on said first spring element to make a bicycle index shifter notch spring and to substantially prevent the deformation of said first bicycle index shifter spring element upon repeated use of said bicycle index shifter;

installing said bicycle index shifter notch spring in said recess; and installing said bicycle index shifter notch element in said bicycle index shifter housing.

17. The method of claim 16 wherein:

said first spring element comprises an inner surface disposed adjacent to said leaf spring;

said first spring element comprises an outer surface disposed opposite said inner surface;

said leaf spring comprises a first end and a second end;

said support comprises an inner support disposed to support said ends of said leaf spring; and said inner support projects from said inner surface of said first spring element.

18. The method of claim 17 wherein:

said support comprises a first support and a second support disposed to support said first spring element in said recess;

said inner support comprises a first inner support and a second inner support projecting from said inner surface;

said first inner support is disposed to support said first end of said leaf spring;

said second inner support is disposed to support said second end of said leaf spring;

said leaf spring comprises a bent portion;

said projection is disposed on a middle portion of said first spring element;

said projection is disposed on said outer surface of said first spring element;

said bent portion of said leaf spring is disposed to contact said inner surface of said first spring element substantially opposite to said projection;

said bent portion of said leaf spring is configured to pre-tension said leaf spring;

said notch spring is configured and disposed to provide an initial biasing force; and said leaf spring is configured and disposed to minimize the deformation of said first spring element and thus substantially maintain said initial biasing force upon repeated use of said bicycle index shifter.

19. The method of claim 18 wherein:

said first spring element comprises means for orienting said leaf spring with said first spring element upon installing said leaf spring on said first spring element;

said means for orienting comprises at least one inclined surface disposed on at least one of said first and second inner supports; and said step of installing comprises a step of moving said leaf spring against said inclined surface to line up said leaf spring with said first spring element.

20. The method of claim 19 wherein:

said step of installing comprises the step of moving said leaf spring in an installation direction to install said leaf spring on said first spring element;

said notch spring comprises means for tightly connecting said leaf spring with said first spring element;

said tightly connecting means comprises an end stop disposed on said first spring element to contact said leaf spring to hold said leaf spring in the installation position by stopping movement of said leaf spring in the installation direction;

said method comprises the step of stopping said step of moving said leaf spring in the installation direction with said end stop;

said tightly connecting means comprises a retaining projection disposed on said first spring element to contact said leaf spring to hold said leaf spring in the installation position by preventing movement of said leaf spring in a direction opposite to the installation direction; and said step of moving said leaf spring in the installation direction comprises the step of moving said leaf spring beyond said retaining projection so that said leaf spring is retained on said first spring element.

* * * * *

UNITED STATES PATENT AND TRADEMARK OFFICE
CERTIFICATE OF CORRECTION

PATENT NO. : 5,921,140
DATED : July 13, 1999
INVENTOR(S) : Nico LEMMENS

It is certified that error appears in the above-identified patent and that said Letters Patent is hereby corrected as shown below:

In column 3, line 46, after the first occurrence of 'the', delete "loaf" and insert --leaf--.

Signed and Sealed this

Sixteenth Day of May, 2000

Attest:

Q. TODD DICKINSON

Attesting Officer      *Director of Patents and Trademarks*